United States Patent
Liu et al.

(10) Patent No.: US 9,436,871 B2
(45) Date of Patent: Sep. 6, 2016

(54) POSTURE DETECTION METHOD AND SYSTEM

(71) Applicant: Shenyang Neusoft Medical Systems Co., Ltd., Shenyang (CN)

(72) Inventors: Jinjun Liu, Shenyang (CN); Wei Li, Shenyang (CN)

(73) Assignee: Shenyang Neusoft Medical Systems Co., Ltd, Shenyang (CN)

( * ) Notice: Subject to any disclaimer, the term of this patent is extended or adjusted under 35 U.S.C. 154(b) by 124 days.

(21) Appl. No.: 14/142,954

(22) Filed: Dec. 30, 2013

(65) Prior Publication Data

US 2015/0092998 A1 Apr. 2, 2015

(30) Foreign Application Priority Data

Sep. 29, 2013 (CN) .......................... 2013 1 0455707

(51) Int. Cl.
G06K 9/00 (2006.01)
G06T 7/00 (2006.01)
G06K 9/46 (2006.01)

(52) U.S. Cl.
CPC ........... G06K 9/00382 (2013.01); G06K 9/468 (2013.01); G06T 7/0042 (2013.01); G06T 2207/10028 (2013.01); G06T 2207/30008 (2013.01); G06T 2207/30196 (2013.01)

(58) Field of Classification Search
CPC .............. G06K 9/00382; G06K 9/468; G06T 7/0042; G06T 2207/10028; G06T 2207/30008; G06T 2207/30196
USPC ........ 382/128, 173, 154, 100, 118, 103, 104
See application file for complete search history.

(56) References Cited

U.S. PATENT DOCUMENTS

| 8,488,888 | B2 * | 7/2013 | Balan | ...................... G06F 3/011 348/77 |
| 8,872,899 | B2 * | 10/2014 | Givon | ..................... G06F 3/011 348/49 |
| 2009/0112070 | A1 * | 4/2009 | Lin et al. | ....................... 600/300 |
| 2009/0129665 | A1 * | 5/2009 | Ishiyama | ............... G01B 11/24 382/154 |
| 2012/0076428 | A1 * | 3/2012 | Yokono | ............. G06K 9/00389 382/219 |

(Continued)

FOREIGN PATENT DOCUMENTS

CN 103246891 A 8/2013

OTHER PUBLICATIONS

The first Office Action issued on Feb. 28, 2015 regarding the Chinese priority patent application (Application No. 201310455707.7).

*Primary Examiner* — Mekonen Bekele
(74) *Attorney, Agent, or Firm* — Kilpatrick Townsend & Stockton LLP

(57) ABSTRACT

A posture detection method and system are provided. The posture detection method includes: obtaining skeleton data of a target person; analyzing the skeleton data to obtain actual posture information of the target person; and recording the actual posture information of the target person. The accuracy of determining the posture information by obtaining the skeleton data of a body is quite high. Besides, the actual posture information is recorded automatically, so that a doctor does not need to record the posture information manually. Therefore, scanning missing or wrong scanning direction caused by inconformity between the real posture of the patient and the recorded posture information may be avoided, which ensures the reliability of medical diagnosis.

8 Claims, 5 Drawing Sheets

(56) References Cited

U.S. PATENT DOCUMENTS

| | | | |
|---|---|---|---|
| 2013/0136358 A1* | 5/2013 | Dedhia et al. | 382/173 |
| 2013/0195330 A1* | 8/2013 | Kim | G06K 9/00201 |
| | | | 382/128 |
| 2013/0222565 A1* | 8/2013 | Guerin | H04N 7/18 |
| | | | 348/77 |
| 2014/0139629 A1* | 5/2014 | Baiyya et al. | 348/46 |
| 2014/0143451 A1* | 5/2014 | Baiyya et al. | 710/9 |
| 2014/0243686 A1* | 8/2014 | Kimmel | 600/476 |
| 2016/0133027 A1* | 5/2016 | Zhao | G06T 7/0081 |
| | | | 382/173 |

* cited by examiner

POSTURE DETECTION METHOD AND SYSTEM

CROSS-REFERENCE TO RELATED APPLICATIONS

The present application claims priority to Chinese patent application No. 201310455707.7, filed on Sep. 29, 2013, and entitled "POSTURE DETECTION METHOD AND SYSTEM", and the entire disclosure of which is incorporated herein by reference.

FIELD OF THE DISCLOSURE

The present disclosure generally relates to medical image technology, and more particularly, to a posture detection method and system.

BACKGROUND OF THE DISCLOSURE

Generally, when a medical imaging diagnosis device is used to scan a patient, a medical worker may determine a specific posture for the patient depending on clinical manifestations and physical characters of the patient. After the patient assumes the determined posture and the medical worker records posture information of the patient in the medical imaging diagnosis device, the medical imaging diagnosis device starts to scan the patient.

In practice, the posture information recorded by the medical workers may be incorrect, or inconformity between the real posture of the patient and the recorded posture information may happen. As a result, a scanning process may be implemented without the patient being in a doctor confirmed posture, leading to scanning missing, wrong scanning direction, and the like, thereby seriously affecting medical diagnosis. Therefore, whether a posture of a patient is correct should be determined to reduce the risk caused by a wrong posture of the patient.

SUMMARY

In practice, since inconformity between a real posture of a patient and recorded posture information may happen in a scanning process, leading to scanning missing, wrong scanning direction, and the like, thereby seriously affecting medical diagnosis. Therefore, embodiments of the present disclosure provide a posture detection method and system.

In an embodiment, a posture detection method is provided, including:

obtaining skeleton data of a target person;

analyzing the skeleton data to obtain actual posture information of the target person; and recording the actual posture information of the target person.

Optionally, after analyzing the skeleton data to obtain actual posture information of the target person, the method may further include: determining whether posture information of the target person is recorded in a system; if the posture information of the target person is recorded in the system, determining whether the actual posture information of the target person is consistent with the posture information of the target person recorded in the system; and if the actual posture information of the target person is consistent with the posture information of the target person recorded in the system, displaying that the target person is in a right posture, or else, recording the actual posture information of the target person.

Optionally, the skeleton data of the target person may be obtained by a depth image capturing device.

Optionally, the step of analyzing the skeleton data to obtain actual posture information of the target person may include at least one selected from: determining a posture direction of the target person based on a coordinate threshold of the skeleton data; calculating a joint angle of the target person and determining posture information of an upper limb of the target person based on the coordinate threshold of the skeleton data; and determining posture information of a lower limb of the target person based on depth coordinates of the coordinate threshold of the skeleton data.

Optionally, the depth image capturing device may be a Leap Motion device or a Kinect device.

In an embodiment, a posture detection system is provided, including:

a data obtaining unit, adapted to obtain skeleton data of a target person;

a data processing unit, adapted to analyze the skeleton data to obtain actual posture information of the target person; and a posture record unit, adapted to record the actual posture information of the target person.

Optionally, the posture detection system may further include:

an information detection unit, adapted to determine whether posture information of the target person is recorded in a scanning system;

a comparison and analysis unit, adapted to determine whether the actual posture information of the target person is consistent with the posture information of the target person recorded in the scanning system when the posture information of the target person is recorded in the scanning system; and an information displaying unit, adapted to display that the target person is in a right posture when the actual posture information of the target person is consistent with the posture information of the target person recorded in the scanning system, where the posture record unit is adapted to record the actual posture information of the target person when the actual posture information of the target person is inconsistent with the posture information of the target person recorded in the scanning system.

Optionally, the data obtaining unit may be configured to use a depth image capturing device to obtain the skeleton data of the target person.

Optionally, the depth image capturing device may be a Leap Motion device or a Kinect device.

Optionally, the data processing unit may include at least one module selected from:

a first determination module, adapted to determine a posture direction of the target person based on a coordinate threshold of the skeleton data;

a second determination module, adapted to calculate a joint angle of the target person and determining posture information of an upper limb of the target person based on the coordinate threshold of the skeleton data; and a third determination module, adapted to determine posture information of a lower limb of the target person based on depth coordinates of the coordinate threshold of the skeleton data.

A posture detection method and system are provided in embodiments of the present disclosure. Skeleton data of a target person is obtained, the skeleton data is analyzed to obtain actual posture information of the target person, and the actual posture information of the target person is recorded. The accuracy of determining the posture information by obtaining the skeleton data of a body is quite high. Besides, the actual posture information is recorded in a scanning system directly, so that a medical worker does not need to record the posture information manually. Therefore, scanning missing or wrong scanning direction caused by inconformity between the real posture of the patient and the recorded posture information may be avoided, which ensures the reliability of the medical diagnosis.

BRIEF DESCRIPTION OF THE DRAWINGS

In order to clarify the disclosure and advantages of the present disclosure, accompanying drawings used in description of embodiments of the present disclosure will be described simply. Obviously, drawings described below are only illustrative and those skilled in the art can obtain other drawings based on these drawings without creative works.

DETAILED DESCRIPTION OF THE DISCLOSURE

In order to clarify the objects, characteristics and advantages of the disclosure, embodiments of present disclosure will be described in detail in conjunction with accompanying drawings.

It should be noted that, posture detection methods provided in embodiments of the present disclosure may be applied in systems which have requirements on postures of a scanned object, such as a CT (Computed Tomography) system, a PET-CT (Positron Emission Tomography-Computed Tomography) system, a DR (Digital Radiography) system and a MRI (Magnetic Resonance Imaging) system. In these systems, when scanning is performed to obtain data, requirements on postures of an object to be detected may exist.

First Embodiment

Figure 1:
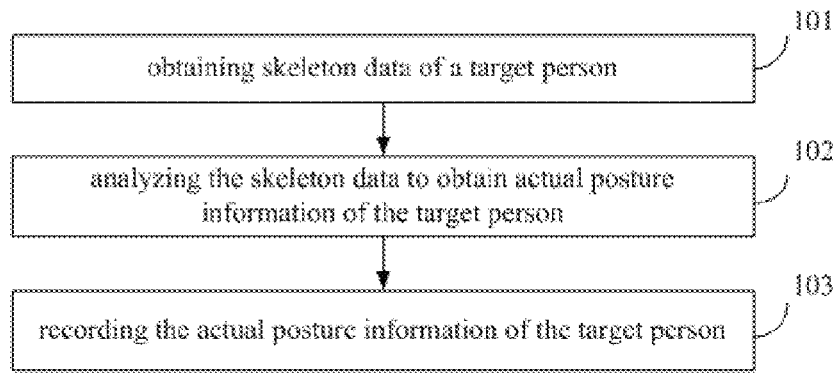
FIG. 1 schematically illustrates a flow chart of a posture detection method according to a first embodiment of the present disclosure.

FIG. 1 schematically illustrates a flow chart of a posture detection method according to a first embodiment of the present disclosure. The method includes following steps.

In S101, obtaining skeleton data of a target person.

In practice, to perform accurate diagnosis to a person during scanning, a medical worker may determine a specific posture for the person depending on clinical manifestations and physical characters of the person. Different postures may result in different scanning data, that is, position information of skeleton of the person may be different depending on different postures of the person. For example, coordinates of an elbow joint under a posture of hands on waist may be different from those under a posture of hands hanging down spontaneously.

In some embodiments, when the target person has assumed a posture according to a certain posture, a skeleton capturing technology may be employed to obtain the skeleton data of the target person. In some embodiments, a depth image capturing device may be used to obtain the skeleton data.

In some embodiments, the depth image capturing device may be a Leap Motion device or a Kinect device. In some embodiments, any other device which can capture the skeleton data of the target person may be employed.

In S102, analyzing the skeleton data to obtain actual posture information of the target person.

In S103, recording the actual posture information of the target person.

The actual posture information may be recorded in various forms, such as a character form, an audio form, an image form and any other forms, which is not limited in the embodiment.

In some embodiments, the recorded actual posture information of the target person may be presented to an operator in any form, such as in a character form, in an audio form and in an image form. In practice, postures of the target person may include: head in first and lying back, feet in first and lying back, head in first and lying right, head in first and lying left, feet in first and lying right, head in first and lying left, etc.

Analyzing the above postures, it could be found that, no matter how complicated or how simple the posture of the target person is, "head first" or "feet first" should be determined in advance. Besides, to post some complicated postures, an upper limb of the target person may be required to assume some poses, such as left hand on waist, right hand on waist, two hands above head and single hand holding high. Besides, to post some complicated postures, a lower limb of the target person may be required to assume some poses, such as left knee bending and right knee bending. To accurately detect the posture of the target person, the skeleton data of the target person may be analyzed carefully, so as to obtain detailed posture information.

In some embodiments, analyzing the skeleton data to obtain actual posture information of the person may include at least one selected from: determining a posture direction of the target person based on a coordinate threshold of the skeleton data; calculating a joint angle of the target person and determining posture information of an upper limb of the target person based on the coordinate threshold of the skeleton data; and determining posture information of a lower limb of the target person based on depth coordinates of the coordinate threshold of the skeleton data.

In the above embodiments, a posture detection method is provided. Skeleton data of a target person is obtained, the skeleton data is analyzed to obtain actual posture information of the target person, and the actual posture information of the target person is recorded in a scanning system. The accuracy of determining the posture information by obtaining the skeleton data of a body is quite high. Besides, the actual posture information is recorded in the scanning system directly. Therefore, scanning missing or wrong scanning direction caused by inconformity between the real posture of the patient and the recorded posture information may be avoided, which ensures the reliability of the medical diagnosis.

Second Embodiment

Figure 2:
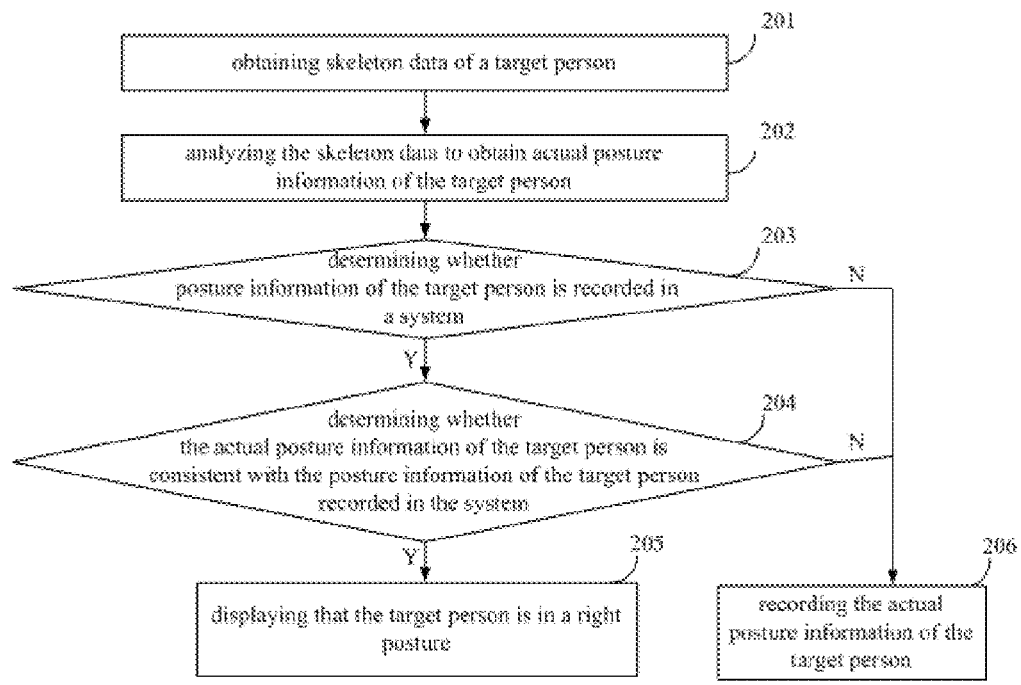
FIG. 2 schematically illustrates a flow chart of a posture detection method according to a second embodiment of the present disclosure.

In practice, posture information of a target person is generally recorded in a system in advance, which is convenient for a doctor to analyze data. To ensure the accuracy of the posture information of the target person recorded in the system, another posture detection method is provided. FIG. 2 schematically illustrates a flow chart of a posture detection method according to a second embodiment of the present disclosure, including following steps.

In S201, obtaining skeleton data of a target person.

In S202, analyzing the skeleton data to obtain actual posture information of the target person.

S201 and S202 may be performed similarly to S101 and S102, which are not described in detail here.

In S203, determining whether posture information of the target person is recorded in a system, if yes, proceeding to S204; or else, proceeding to 206.

In S204, determining whether the actual posture information of the target person is consistent with the posture information of the target person recorded in the system, if yes, proceeding to S205; or else, proceeding to 206.

In S205, displaying that the target person is in a right posture.

In S206, recording the actual posture information of the target person.

Based on the first embodiment, in the second embodiment, by determining whether the actual posture information of the target person is consistent with the posture information of the target person recorded in the system, whether the posture information recorded in the system is correct may be determined. As such, the actual posture information of the target person can be recorded, so as to provide convenience for a doctor to perform diagnosis and analysis.

Third Embodiment

Figure 3:
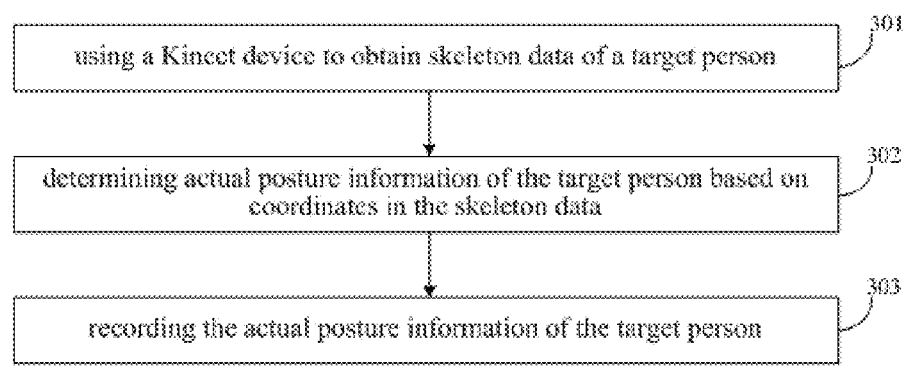
FIG. 3 schematically illustrates a flow chart of a posture detection method according to a third embodiment of the present disclosure.

Hereafter, the posture detection method provided in the second embodiment will be described in detail as a third embodiment. In the embodiment, a Kinect device is used to obtain the skeleton data. A target person may have a posture of head in first, left arm perpendicular to the body, right elbow bending, right hand on waist and two legs together. FIG. 3 schematically illustrates a flow chart of the posture detection method described in the third embodiment, including following steps.

In S301, using a Kinect device to obtain skeleton data of a target person.

In this embodiment, the Kinect device as a depth image capturing device has a horizontal angle of 57°, a vertical angle of 43°, a rotatable range from −27° to 27°, and a sensing depth range from 1.2 meter to 3.5 meter. Different Kinect devices may have different parameters. In practice, the Kinect device may be installed according to these parameters, so as to scan the target person and obtain the skeleton data thereof. In some embodiments, to obtain more and more reliable skeleton data, a plurality of Kinect devices may be used to obtain the skeleton data of the target person from different directions.

Figure 4:
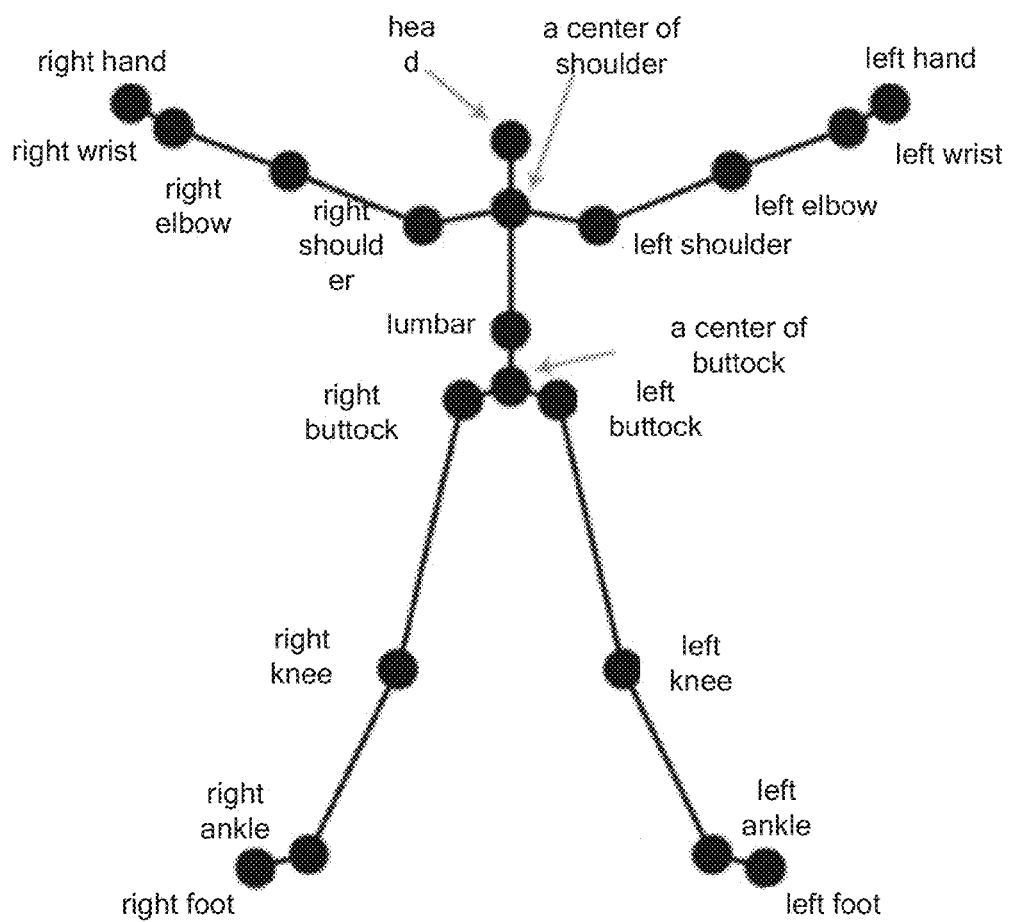
FIG. 4 schematically illustrates a diagram of a body skeleton structure identified by an image capturing device described in the third embodiment of the present disclosure.

When a Kinect device is used, initialization may be performed. The initialization is based on an object which is earliest used in an application program developed by Kinect, called Kinect Sensor object. The Kinect Sensor object represents a Kinect hardware device and has an event called Skeleton Frame Ready event. When new skeleton data generates in Skeleton Stream, the Skeleton Frame Ready event may be triggered. Each frame generated in Skeleton Stream may be a set of skeleton object and each skeleton object includes data representing positions of skeleton and skeleton joints. FIG. 4 schematically illustrates a diagram of a body skeleton structure identified by an image capturing device described in the third embodiment. In FIG. 4, identifiers of all the joints are illustrated, such as head, shoulder, elbow, etc. In practice, 3D (Three Dimensions) vector data of each joint may be listed. Skeleton Stream is initialized and Skeleton Frame Ready event of the Kinect Sensor object is registered. Once the Skeleton Frame Ready event is triggered, Open Skeleton Frame method is called to obtain current skeleton data frame. Then a Skeleton array of the skeleton data frame, which stores a series of Joint structures to describe joints to be tracked (such as head, hand, foot, etc.) in skeleton, is traversed, where the Joint structure includes 3D coordinates of a joint including a horizontal coordinate X, a vertical coordinate Y and a depth coordinate Z. Based on array traverse and Joint Type of joints, particular joints may be found out, where the Joint Type is an enumeration type.

In S302, determining actual posture information of the target person based on coordinates in the skeleton data.

In some embodiments, S302 may include at least one selected from: determining a posture direction of the target person based on a coordinate threshold of the skeleton data; calculating a joint angle of the target person and determining posture information of an upper limb of the target person based on the coordinate threshold of the skeleton data; and determining posture information of a lower limb of the target person based on depth coordinates of the coordinate threshold of the skeleton data.

Coordinates of joints of the target person may be obtained based on the skeleton data. In some embodiments, determining a posture direction of the target person based on a coordinate threshold of the skeleton data may include determining "head first" or "feet first", which is called a coordinate threshold identification method. This method may include following steps. First, in step one, comparing a horizontal coordinate X of a head with a horizontal coordinate X of a center of a buttock, if the horizontal coordinate X of the head is greater than the horizontal coordinate X of the buttock, determining that the head enters a scanning system first, and else determining that feet enter first. Then, determining whether a left arm is perpendicular to the body. Specifically, calculating a first difference between a horizontal coordinate X of a left shoulder and a horizontal coordinate X of a left elbow and calculating a second difference between the horizontal coordinate X of the left shoulder and a horizontal coordinate X of a left wrist; if the first difference and the second difference are smaller than or equal to a coordinate threshold, determining that the left shoulder, the left elbow and the left wrist are on one straight line; and then calculating a third difference between a horizontal coordinate X of the left wrist and a horizontal coordinate X of a lumbar and calculating a fourth difference between a horizontal coordinate X of a left shoulder and a horizontal coordinate X of the lumbar, if the third difference and the fourth difference are smaller than or equal to the coordinate threshold, determining that a left arm and the left wrist are perpendicular to the body. Different depth coordinates Z correspond to different X and Y coordinate ranges and different coordinate thresholds. For example, the closer the object to the Kinect device is, the smaller the X and Y coordinates of the object are and the greater the coordinate threshold is. Therefore, during the initialization, different thresholds which correspond to different depths may be calculated.

In some embodiments, calculating a joint angle of the target person and determining posture information of an upper limb of the target person based on the coordinate threshold of the skeleton data may be called a joint angle identification method. This method may include following steps. First, in step one, determining that a right elbow is bending and a right hand is on a waist. Generally, a triangle can be constructed according to three joints, lengths of three sides of the triangle are calculated based on coordinates of the three joints, and angles between any two adjacent sides of the triangle can be calculated based on the law of cosines. In this embodiment, coordinates of the right shoulder, the right elbow and the right hand are obtained and a bending angle of the right elbow is calculated based on the law of cosines. If the bending angle of the right elbow satisfies a bending angle required in clinic and a horizontal coordinate X of the right hand is smaller than a horizontal coordinate X of the right shoulder, it is determined that the right elbow is bending and the right hand is on the waist. Afterward, in step two, determining whether thighs and cruses are perpendicular to each other spontaneously and keep flat. A triangle is constructed according to a left knee, a left ankle hand and a left buttock, and a bending angle of the left knee is calculated based on the law of cosines. If the bending angle of the left knee satisfies a bending angle required in clinic and a horizontal coordinate X of the left knee is greater than a horizontal coordinate X of the left buttock and smaller than a horizontal coordinate X of the left ankle, it is determined that a left thigh and a left crus are perpendicular to each other spontaneously. Similarly, whether a right thigh and a right crus are perpendicular to each other spontaneously may be determined. A triangle is constructed according to a right knee, a right ankle hand and a right buttock, and a bending angle of the right knee is calculated based on the law of cosines. If the bending angle of the right knee satisfies a bending angle required in clinic and a horizontal coordinate X of the right knee is smaller than a horizontal coordinate X of the right buttock and greater than a horizontal coordinate X of the right ankle, it is determined that the right thigh and the right crus are perpendicular to each other spontaneously.

In some embodiments, determining posture information of a lower limb of the target person based on depth coordinates of the coordinate threshold of the skeleton data may be called a depth coordinate identification method. Determining whether a knee is bending spontaneously may include: obtaining Z coordinates of the left knee and a left foot; and determining whether a difference between the Z coordinates of the left knee and the left foot reaches a threshold, if yes, determining that the left leg is bending spontaneously.

Based on any one of the coordinate threshold identification method, the joint angle identification method and the depth coordinate identification method or any combination thereof, the actual posture information of the target person may be determined.

In S303, recording the actual posture information of the target person.

Based on analysis in S302, the actual posture information of the target person is the head entering the scanning system first, the left arm spontaneously perpendicular to the body, the right hand being on the waist and the two legs being together, which is transmitted into the scanning system and saved therein.

In the above embodiments, a posture detection method is provided. Skeleton data of a target person is obtained, the skeleton data is analyzed to obtain actual posture information of the target person, and the actual posture information of the target person is recorded. The accuracy of determining the posture information by obtaining the skeleton data of a body is quite high. Besides, the actual posture information is recorded. Therefore, scanning missing or wrong scanning direction caused by inconformity between the real posture of the patient and the recorded posture information may be avoided, which ensures the reliability of the medical diagnosis.

Fourth Embodiment

Figure 5:
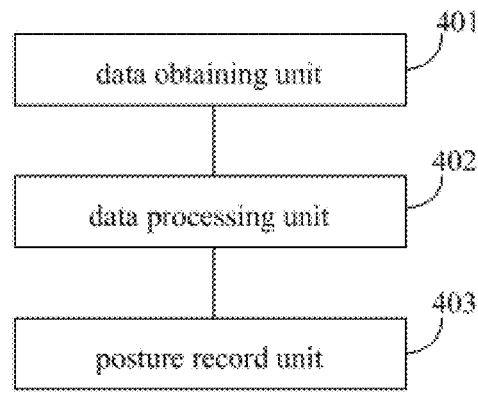
FIG. 5 schematically illustrates a block diagram of a posture detection system according to a fourth embodiment of the present disclosure.

In this embodiment, a posture detection system is provided. FIG. 5 schematically illustrates a block diagram of the posture detection system provided in the fourth embodiment, including: a data obtaining unit 401, a data processing unit 402 and a posture record unit 403. Detailed structures in the system and connections of the structures may be described in conjunction with a working principle of the system.

The data obtaining unit 401 is adapted to obtain skeleton data of a target person; the data processing unit 402 is adapted to analyze the skeleton data to obtain actual posture information of the target person; and the posture record unit 403 is adapted to record the actual posture information of the target person.

In some embodiments, a depth image capturing device may be employed to obtain the skeleton data of the target person in the data obtaining unit 401.

In some embodiments, the depth image capturing device may be a Leap Motion device or a Kinect device.

In some embodiments, the data processing unit 402 may include at least one module selected from: a first determination module, adapted to determine a posture direction of the target person based on a coordinate threshold of the skeleton data; a second determination module, adapted to calculate a joint angle of the target person and determining posture information of an upper limb of the target person based on the coordinate threshold of the skeleton data; and a third determination module, adapted to determine posture information of a lower limb of the target person based on depth coordinates of the coordinate threshold of the skeleton data.

By employing any one of the first determination module, the second determination module and the third determination module or any combination thereof, the actual posture information of the target person may be determined.

In the above embodiment, a posture detection method is provided. Skeleton data of a target person is obtained, the skeleton data is analyzed to obtain actual posture information of the target person, and the actual posture information of the target person is recorded. The accuracy of determining the posture information by obtaining the skeleton data of a body is quite high. Scanning missing or wrong scanning direction caused by inconformity between the real posture of the patient and the recorded posture information may be avoided, which ensures the reliability of the medical diagnosis.

Fifth Embodiment

Figure 6:
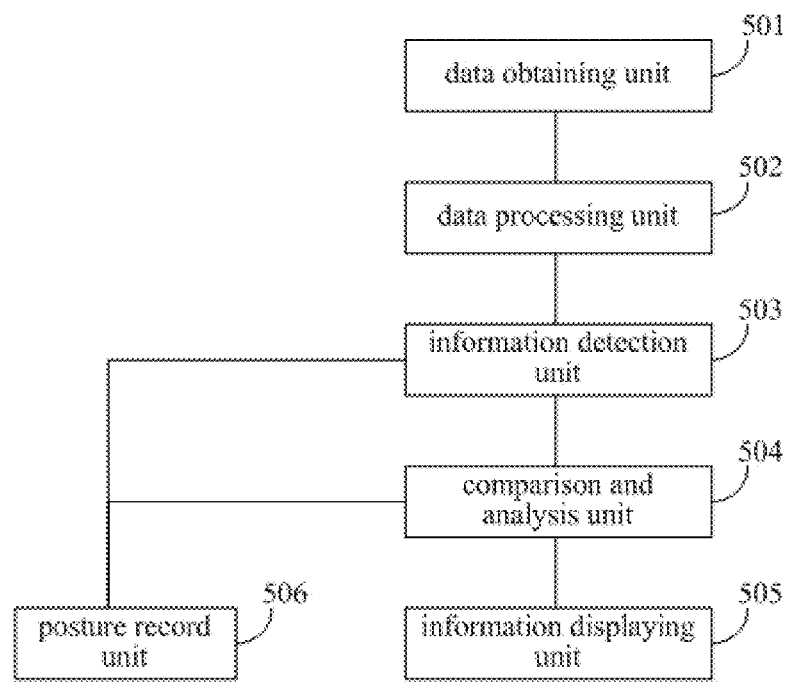
FIG. 6 schematically illustrates a block diagram of a posture detection system according to a fifth embodiment of the present disclosure.

In this embodiment, a posture detection system, which corresponds to the posture detection method provided in the second embodiment, is provided. FIG. 6 schematically illustrates a block diagram of the posture detection system provided in the fifth embodiment, including: a data obtaining unit 501, a data processing unit 502, an information detection unit 503, a comparison and analysis unit 504, an information displaying unit 505 and a posture record unit 506. Detailed structures in the system and connections of the structures may be described in conjunction with a working principle of the system.

The data obtaining unit 501 is adapted to obtain skeleton data of a target person; the data processing unit 502 is adapted to analyze the skeleton data to obtain actual posture information of the target person; the information detection unit 503 is adapted to determine whether posture information of the target person is recorded in a scanning system; the comparison and analysis unit 504 is adapted to determine whether the actual posture information of the target person is consistent with the posture information of the target person recorded in the scanning system when the posture information of the target person is recorded in the scanning system; the information displaying unit 505 is adapted to display that the target person is in a right posture when the actual posture information of the target person is consistent with the posture information of the target person recorded in the scanning system; and the posture record unit 506 is adapted to record the actual posture information of the target person when the actual posture information of the target person is inconsistent with the posture information of the target person recorded in the scanning system.

The details of the data obtaining unit 501 and the data processing unit 502 are similar with those of the data obtaining unit 401 and the data processing unit 402, which are not described in detail here.

In the posture detection system provided in the above embodiment, the skeleton data of the target person is analyzed to obtain posture information of the target person and whether the posture information recorded in the scanning system is correct may be determined. As such, the actual posture information of the target person can be recorded, so as to provide convenience for a doctor to perform diagnosis and analysis.

Sixth Embodiment

Figure 7:
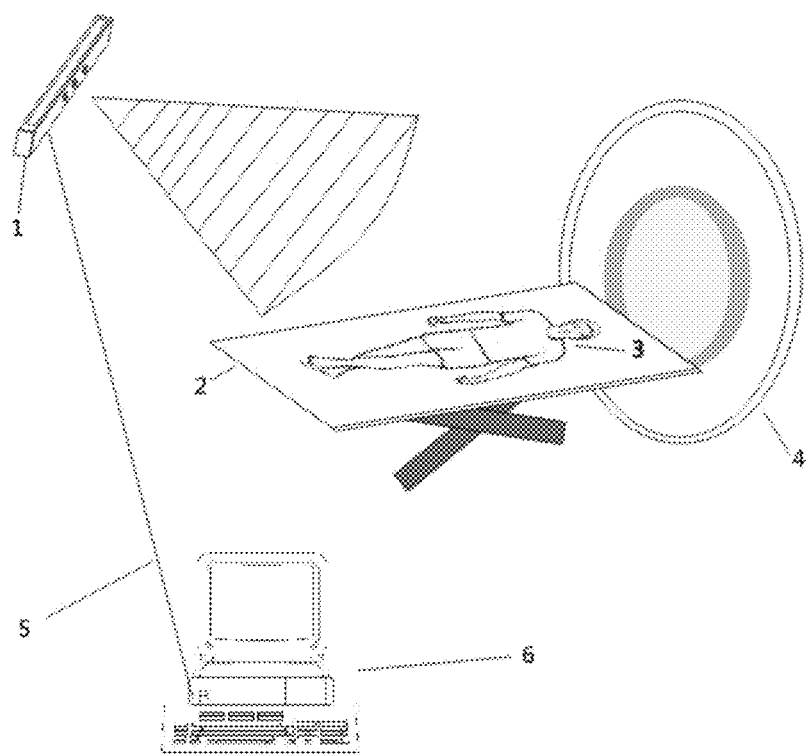
FIG. 7 schematically illustrates a block diagram of a posture detection system according to a sixth embodiment of the present disclosure.

In this embodiment, a posture detection system may be described in detail. Since computers have strong data calculation and storing functions, computers are commonly used to store information in scanning systems in practical applications. In some embodiments, the posture detection system is configured to use a depth image capturing device to obtain skeleton data of a target person and a computer is used to process and store data. Referring to FIG. 7, the depth image capturing device 1, a CT scanning machine 2, a target person 3, a gantry 4, a USB data line 5, and a computer 6 are illustrated.

The depth image capturing device 1 is used to scan the target person 3 to obtain the skeleton data which is then transmitted to the computer 6.

The computer 6 analyzes the skeleton data to obtain actual posture information of the target person and record the actual posture information therein.

To obtain more accurate medical diagnosis results, the posture detection system may include a plurality of depth image capturing devices to obtain skeleton data. Further, the computer analyzes all the skeleton data and determines the actual posture information of the target person.

In the posture detection system provided in the above embodiment, skeleton data of a target person is obtained, the skeleton data is analyzed to obtain actual posture information of the target person, and the actual posture information of the target person is recorded. The accuracy of determining the posture information by obtaining the skeleton data of a body is quite high. Besides, the actual posture information is recorded in a scanning system directly. Therefore, scanning missing or wrong scanning direction caused by inconformity between the real posture of the patient and the recorded posture information may be avoided, which ensures the reliability of the medical diagnosis.

It should be noted that, in descriptions of the present disclosure, terms like "first" and "second" are used merely for distinguishing an entity/operation from another entity/operation, which may not require or suggest that the entities/operations must have substantial relationship or order. Moreover, the term "comprising", "including" or any other variants thereof are intended to cover a non-exclusive inclusion, such that a number of processes, methods, articles, or devices including certain elements not only include those elements, but also include other elements not explicitly listed, or include inherent elements for such processes, methods, articles or devices. In the case where no more restriction is illustrated, elements with limitations of "includes a . . . " do not preclude that there are other same elements included in processes, methods, articles, or devices of the elements.

It should be noted that, those skilled in the art may understand all or some of the processes in the methods described above can be realized by using computer programs to instruct corresponding hardware. The programs may be stored in a readable storage medium in a computer. When the programs are implemented, the processes in the methods in the above embodiments may be performed. The readable storage medium may be diskette, CD (Compact Disc), ROM (Read-Only Memory), RAM (Random Access Memory) or the like.

A posture detection method and system are described in detail. Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A posture detection method, comprising:
obtaining, by an image capturing device, skeleton data of a target person;
analyzing the skeleton data to obtain actual posture information of the target person;
determining whether posture information of the target person is recorded in a system;
if the posture information of the target person is recorded in the system, determining whether the actual posture information of the target person is consistent with the posture information of the target person recorded in the system; and
if the actual posture information of the target person is consistent with the posture information of the target person recorded in the system, displaying that the target person is in a right posture, or if the actual posture information of the target person is inconsistent with the posture information of the target person recorded in the system, recording the actual posture information of the target person.

2. The posture detection method according to claim 1, wherein the image capturing device is a depth image capturing device.

3. The posture detection method according to claim 2, wherein the depth image capturing device is a Leap Motion device or a Kinect device.

4. The posture detection method according to claim 1, wherein the step of analyzing the skeleton data to obtain actual posture information of the target person comprises at least one selected from:
- determining a posture direction of the target person based on a coordinate threshold of the skeleton data;
- calculating a joint angle of the target person and determining posture information of an upper limb of the target person based on the coordinate threshold of the skeleton data; and
- determining posture information of a lower limb of the target person based on depth coordinates of the coordinate threshold of the skeleton data.

5. A posture detection system, comprising:
- an image capturing device, configured to obtain skeleton data of a target person, wherein the data obtaining unit comprises an image capturing device;
- a processor, configured to: analyze the skeleton data to obtain actual posture information of the target person;
- determine whether posture information of the target person is recorded in a scanning system;
- determine whether the actual posture information of the target person is consistent with the posture information of the target person recorded in the scanning system when the posture information of the target person is recorded in the scanning system; and
- record the actual posture information of the target person under the condition that the actual posture information of the target person is inconsistent with the posture information of the target person recorded in the scanning system; and
- a displayer, configured to display that the target person is in a right posture when the actual posture information of the target person is consistent with the posture information of the target person recorded in the scanning system,
- where the processor is coupled with the image capturing device and the displayer.

6. The posture detection system according to claim 5, wherein the image capturing device is a depth image capturing device.

7. The posture detection system according to claim 6, wherein the depth image capturing device is a Leap Motion device or a Kinect device.

8. The posture detection system according to claim 5, wherein the processor comprises at least one module selected from:
- a first determination module, configured to determine a posture direction of the target person based on a coordinate threshold of the skeleton data;
- a second determination module, configured to calculate a joint angle of the target person and determining posture information of an upper limb of the target person based on the coordinate threshold of the skeleton data; and
- a third determination module, configured to determine posture information of a lower limb of the target person based on depth coordinates of the coordinate threshold of the skeleton data.

* * * * *